United States Patent
Chen et al.

(10) Patent No.: US 7,593,391 B2
(45) Date of Patent: Sep. 22, 2009

(54) SYSTEM AND METHOD FOR HIGH SPEED DISTRIBUTED CABLE BROADBAND SYSTEM

(75) Inventors: Hung Wen Chen, Chu-Pei (TW); Gang Qiang, Chu-Pei (TW); Yu Leen Fu, Chu-Pei (TW); Lee Wang, Chu-Pei (TW)

(73) Assignee: Browan Communications Incorporation, Taipei (TW)

( * ) Notice: Subject to any disclaimer, the term of this patent is extended or adjusted under 35 U.S.C. 154(b) by 890 days.

(21) Appl. No.: 11/049,416

(22) Filed: Feb. 2, 2005

(65) Prior Publication Data

US 2006/0171375 A1 Aug. 3, 2006

(51) Int. Cl.
*H04L 12/66* (2006.01)
*H04N 7/173* (2006.01)

(52) U.S. Cl. .................. 370/352; 370/401; 725/110; 725/119

(58) Field of Classification Search .......... 370/352, 370/401; 725/110, 119
See application file for complete search history.

(56) References Cited

U.S. PATENT DOCUMENTS

| 7,075,918 | B1 * | 7/2006 | Kung et al. | 370/352 |
| 7,120,139 | B1 * | 10/2006 | Kung et al. | 370/352 |
| 7,272,847 | B2 * | 9/2007 | Smith et al. | 725/129 |
| 2002/0038459 | A1 * | 3/2002 | Talmola et al. | 725/81 |
| 2003/0200551 | A1 * | 10/2003 | Kang | 725/120 |
| 2004/0181811 | A1 * | 9/2004 | Rakib | 725/122 |
| 2005/0122976 | A1 * | 6/2005 | Poli et al. | 370/392 |
| 2005/0232186 | A1 * | 10/2005 | Karaoguz et al. | 370/328 |
| 2006/0007899 | A1 * | 1/2006 | White | 370/338 |
| 2006/0130107 | A1 * | 6/2006 | Gonder et al. | 725/110 |
| 2006/0171423 | A1 * | 8/2006 | Helms et al. | 370/535 |

* cited by examiner

*Primary Examiner*—Alpus H Hsu
(74) *Attorney, Agent, or Firm*—Kusner & Jaffe

(57) ABSTRACT

The Hi-SD CBS includes a termination unit and pluralities of distributed customer premise units connected through the cable TV (CATV) network. The radio signals in Hi-SD CBS are propagating inside the co-axial cable. To insure the linking quality between the termination unit and customer premise devices, preamble procedures are required to adjust the transmitting radio power, the receiver sensitivity, the channel equalization, and to synchronize the transceivers for data transmission between the termination unit and the customer premise devices. To guarantee a secure link between the termination unit and an individual customer premise device or a group of premise devices, the termination unit provides different encryption keys to different customer premise device groups.

7 Claims, 11 Drawing Sheets

Unit : dB/100meters

| Frequencies (GHz) | φ1.13 mm | RG-316 | LMR-100 | LMR-100 | RG-58 | LMR-200 | LMR-300 | LMR-400 |
|---|---|---|---|---|---|---|---|---|
| 0.5 | 37.7 | 18.6 | 15.6 | 16.1 | 9.9 | 8.0 | 4.6 | 3.3 |
| 1.0 | 54.6 | 28.6 | 22.8 | 24.0 | 14.4 | 11.9 | 6.7 | 4.9 |
| 1.5 | 67.2 | 36.5 | 28.8 | 29.9 | 18.3 | 15.0 | 8.2 | 6.1 |
| 2.0 | 78.1 | 43.7 | 33.6 | 35.5 | 22.1 | 17.7 | 9.8 | 7.4 |
| 2.5 | 87.6 | 49.8 | 38.7 | 40.1 | 26.3 | 20.0 | 11.0 | 8.1 |
| 3.0 | 97.2 | 55.8 | 42.6 | 45.2 | 30.0 | 22.2 | 12.2 | 9.1 |
| 3.5 | 105.2 | - | 46.6 | 48.8 | - | - | 13.1 | - |
| 4.0 | 113.1 | 66.4 | 50.9 | 53.1 | 34.8 | 26.2 | 14.0 | 10.4 |
| 4.5 | 120.3 | - | 54.0 | 57.1 | - | - | 14.9 | - |
| 5.0 | 128.8 | 76.8 | 57.6 | 60.8 | 39.2 | 29.8 | 15.8 | 11.9 |
| 5.5 | 134.3 | - | 60.9 | 64.7 | - | - | 16.8 | - |
| 6.0 | 141.8 | 85.3 | 63.7 | 69.1 | 45.4 | 33.3 | 17.7 | 13.2 |

Fig.5

SYSTEM AND METHOD FOR HIGH SPEED DISTRIBUTED CABLE BROADBAND SYSTEM

BACKGROUND OF THE INVENTION

1. Field of the Invention

This invention relates to a cable broadband system, and more particularly to a high-speed distributed cable broadband system (Hi-SD CBS) that employs access points (APs) and client devices in wireless local access network (WLAN) systems.

2. Description of the Prior Art

In a typical cable network system providing cable broadband service, a headend unit with Cable Modem Termination System (CMTS) unit and customer premise devices with cable modems are shown in FIG. 1. CMTS and cable modems apply the standard based on DOCSIS. The downstream data from CMTS to a customer premise applies the upper band of frequencies up to 900 MHz, while the upstream data from a customer premise device to CMTS applies the lower bands of the frequency channels. The typical downstream and upstream bandwidths are 27 Mbps, and 500 Kbps to 10 Mbps depending on the service level agreement, respectively. Typical 500 to 2000 active subscribers in a cable network segment share the downstream and upstream bandwidths.

Referring to FIG. 1, the cable headend 100 distributes the TV program and data communication to customer premises 108. The cable headend 100 comprises a backplane 101 electrically connected an internet 102. In general, the backplane 101 is made of a PCB to provide a connection by controlling cards, such as display card, audio card or network card, of an electrical system. Moreover, the backplane 101 may be designed with a fiber channel to communicate with the internet 102 with fiber transmission. A receiver 103 is electrically connected with the backplane 101 to receive a TV broadcasting 104 signals. A transmitter module 105 is electrically connected with the backplane 101 to transmit the TV broadcasting 104 signals. CMTS 106 connects with the customer premise 108 through a cable network 107. Besides, MPEG module 109 is electrically connected with the backplane 101. In general, the MPEG module 109 comprises a MPEG encoder and a MPEG decoder. A web server 110 is electrically connected with the backplane 101 to communicate with the internet 102. A video server 111 is electrically connected the backplane 101 to process the received TV broadcasting 104 signals. A statmux port concentrator 112 is electrically connected the backplane 101 to optimize the data flow. The customer premise 108 may comprise a set top box 113 and a cable modem 114.

Due to the fast growth and technology advance in WLAN system, the performance of WLAN systems has been improving dramatically in recent years, while the cost for WLAN systems remains a good economic value. Besides its success in Small Office and Home Office (SOHO) areas, WLAN technologies have further been applied to enable the wireless environment in different applications such as public communications, surveillance systems, voice services, and video services. It is specially appreciated that with its low cost, various functionalities, and high performance, WLAN system is the first time to be applied in cable TV network systems. The proposed High-Speed Distributed Cable Broadband System (Hi-SD CBS) using WLAN-like systems provide a very attractive and competitive alternative for high-speed cable broadband service besides the conventional cable modem systems.

In view of the aforementioned, the present invention provides a system and method for High Speed Distributed Cable Broadband System to overcome the above drawback.

SUMMARY OF THE INVENTION

This invention relates to systems and methods to enable high-speed broadband service in cable TV networks. In particular, High-Speed Distributed Cable Broadband System (Hi-SD CBS) consists of termination devices and customer premise devices similar to access points and client devices in Wireless Local Access Network (WLAN) systems, respectively. The radio signals from the termination device and customer premise devices are directly fed into the co-axial cables in cable TV network systems in contrast to the radio signals propagating in the air between access point and client devices in WLAN systems. All the ideas and technologies designed for WLAN systems such as hardware and software protocols for network management, security, and Quality of Service (QoS) can be sufficiently applied to the proposed High-Speed Distributed Cable Broadband System (Hi-SD CBS).

The main objective of the present invention is to provide a high-speed distributed cable broadband system (Hi-SD CBS) that employs access points(APs) and client devices in wireless local access network (WLAN) systems. The present invention proposes an innovative high-speed distributed cable broadband system similar to those using WLAN technologies. The proposed system applies the access point and client devices as the CMTS and cable modems in the conventional cable broadband network systems, respectively.

Another objective of the present invention is to provide the Hi-SD CBS based on the system infrastructure of wireless local access network (WLAN).

The yet objective of the present invention is to provide the Hi-SD CBS with lower propagating loss.

The further objective of the present invention is to provide the Hi-SD CBS with larger reachable propagating range.

The radio signals propagate through the entire cable networks to make links between the access point and client devices. Although there is some amount of radio signal loss propagating along co-axial cables the propagating loss is far less than those radiating from devices' antennas in wireless environments. The network reachable range in cable network system shall be larger than in wireless environments.

The Hi-SD CBS of the present invention comprises a termination unit having a first network bridging device, a plurality of second network bridging devices connected with the first network bridging device through a cable network, and a customer premise unit connected to the second network bridging device through the cable network. The customer premise unit, the first network bridging device and second network bridging device are communicated with each other through a communication protocol.

The termination unit further comprises a backplane electrically connected with an internet. A receiver is electrically connected with the backplane to receive a TV broadcasting signal. A transmitter module is electrically connected with the backplane and second network bridging device to transmit the TV broadcasting signal. A MPEG module is electrically connected with the backplane. A video server is electrically connected the backplane to process the received TV broadcasting signal. A web server is electrically connected with the backplane to communicate with the internet. A statmux port concentrator is electrically connected the backplane.

The first and second network bridging devices comprise an AP, bridge or router. The transmitter module comprises a transmitter and a modulator. MPEG module comprises a MPEG encoder and a MPEG decoder. The customer premise unit comprises a set top box and client device. The client device comprises a PC connected the set top box.

Based on the spirit of the present invention, the present invention provides a high-speed distributed cable broadband system (Hi-SD CBS). The Hi-SD CBS comprises at least one client device connected with an AP through a cable network. A modem is connected with the AP and an internet through the cable network. The client device and the AP are communicated with each other through a communication protocol. The modem comprises a broadband modem or leased lines.

A Hi-SD CBS comprises first client device, second client device having a short-range wireless transmission module to transmit or receive the radio signals, and an AP connected with the first client device and the second client device through a cable network. The AP is connected with an internet through the cable network. The first, second client device and the AP are communicated with each other through a communication protocol.

The short-range wireless transmission module transmit the radio signals to facilitate receiving by the second short-range wireless transmission module of another client device, and the short-range wireless transmission module may receive a radio signals emitted by the second short-range wireless transmission module. Another client device is communicated with the second client device through a communication protocol.

A cable network system comprises one or more client devices having a short-range wireless transmission module, and an AP connected with the one or more client devices through a cable network. The AP is connected with an internet. The one or more client devices and the AP are communicated with each other through a communication protocol.

A cable network system comprises one or more client device groups. An AP is connected with the one or more client device groups through a cable network. A gateway is connected with the AP and a local network. A security server is communicated with the AP through the gateway. The one or more client device groups and the AP are communicated with each other through a communication protocol. The one or more client device groups can be secured and isolated by sending out different encryption keys from the AP. The local network comprises WAN, MAN or LAN. The cable network system further comprises a switch connected with the AP and the gateway.

In the present invention, links between the client device and the AP are through a preamble sequences to adjust the transmitting radio power, the receiver sensitivity, and channel equalization, and to synchronize the transmitter and the receiver for data transmission between the client device and the AP.

The communication protocol comprises 802.3 and 802.11 including but not limited to, 802.11a, 802.11b, 802.11g, 802.11i or 802.11x.

BRIEF DESCRIPTION OF THE DRAWINGS

The above objects, and other features and advantages of the present invention will become more apparent after reading the following detailed description when taken in conjunction with the drawings, in which:

FIG. 5 shows the propagation loss for length of 100 meters for different co-axial cables versus radio frequencies.

DESCRIPTION OF THE PREFERRED EMBODIMENT

The present invention proposes an innovative High-Speed Distributed Cable Broadband System (Hi-SD CBS). Although we illustrate the proposed embodiment using 802.11 WLAN systems, the applications of the proposed technologies are not limited to different frequency bands and varieties of communication methods.

Figure 1:
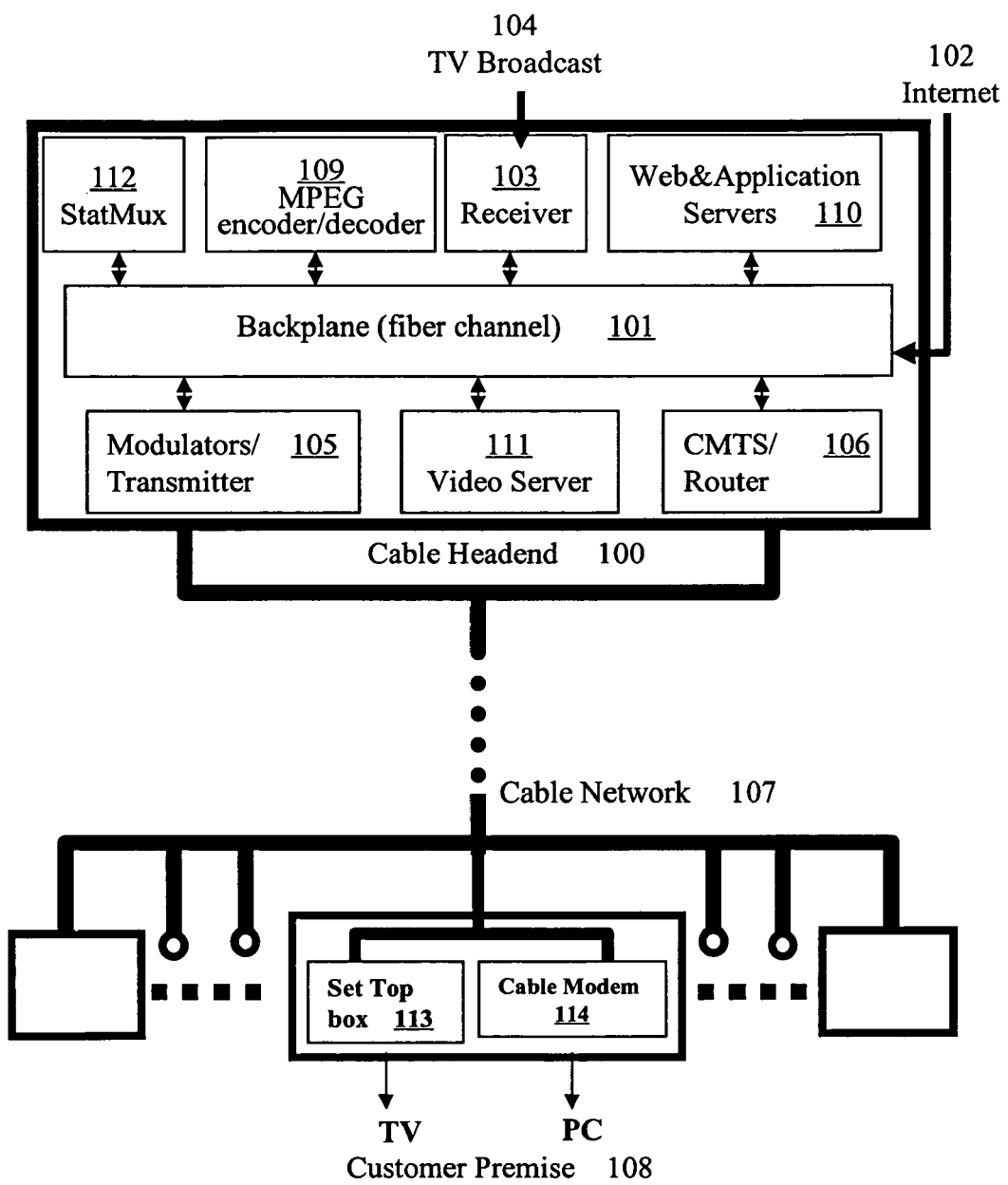
FIG. 1 illustrates cable TV network systems with conventional cable modems providing both TV service and cable broadband service.
Figure 2:
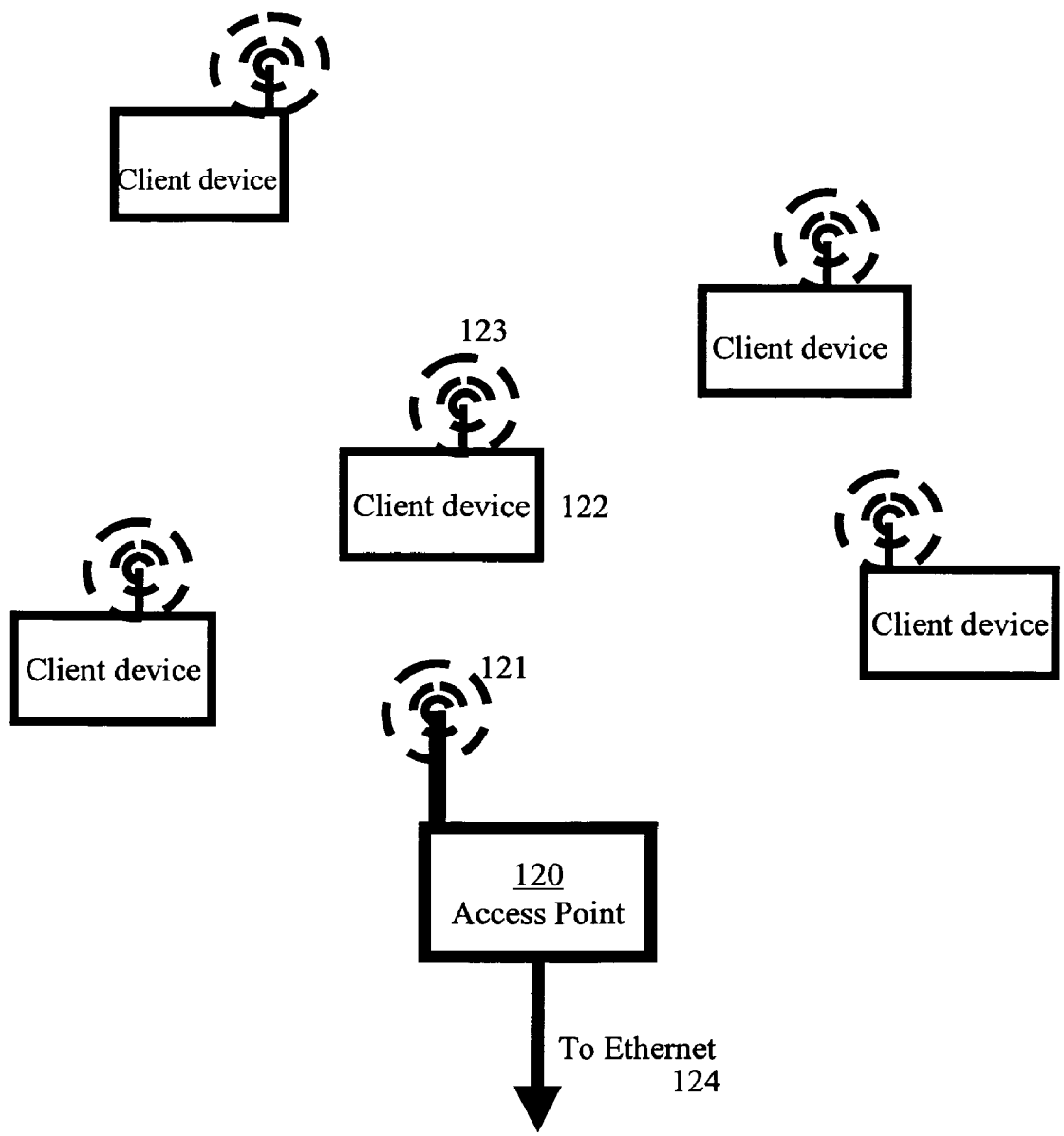
FIG. 2 illustrates a wireless local access network system.

The matched impedance connectors increase the transmitting radio signals into co-axial cable system and reduce the reflective radio signals back to the transmitting devices. The radio signals propagate through the entire cable networks to make links between the access point and client devices. The cables in the network act like extended ultra-high gain antennas inter-connected between access point and client devices as shown in FIG. 2.

Figure 3:
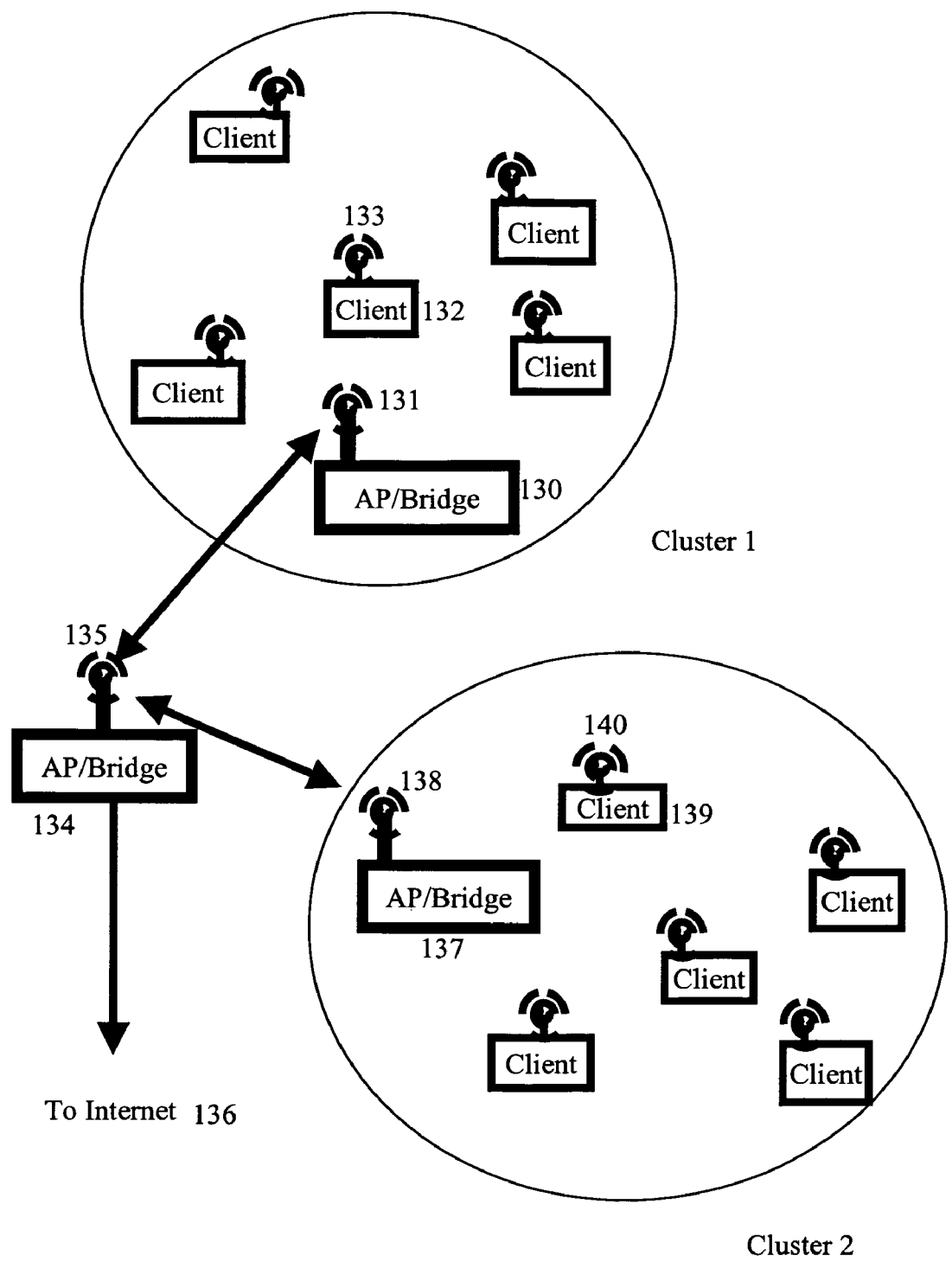
FIG. 3 illustrates two clusters of WLANs with wireless bridges aggregating into an AP to Internet.
Figure 4:
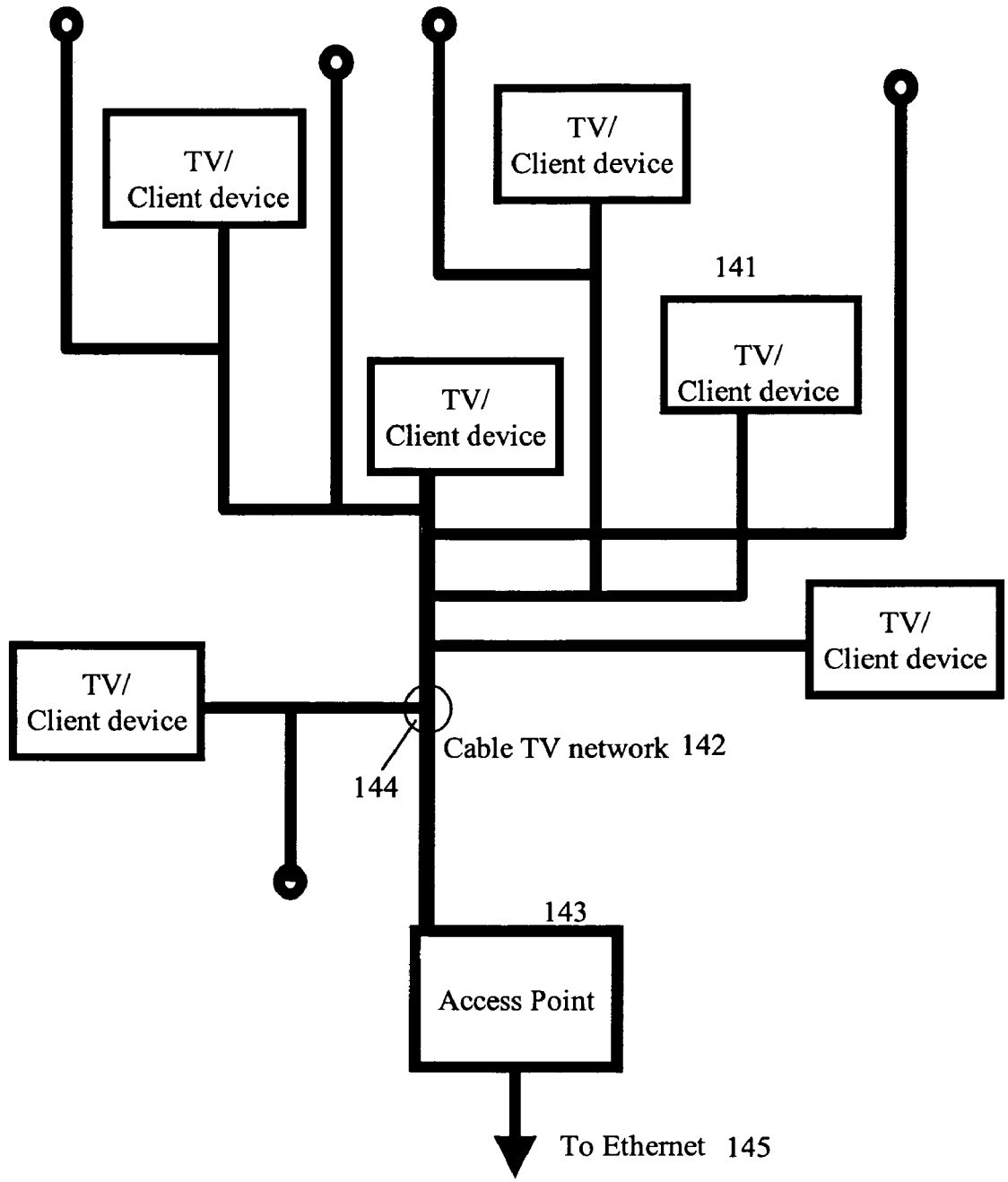
FIG. 4 illustrates an AP and several client devices connected to nodes of a cable TV network system.

While CMTS and cable modems currently provide all the broadband services in cable TV network systems, we propose another alternative for the cable broadband service based on the system infrastructure of Wireless Local Access Network (WLAN). The typical WLAN System consists of an access point and several client devices (FIG. 2) or plural access points and clusters of client devices bridging between clusters or aggregating from clusters (FIG. 3). The radio signals in WLAN systems are propagating through air. In this newly proposed cable broadband system, we feed the radio signal direct into the cable TV network to form a distributed cable broadband system as shown in FIG. 4.

The proposed system of the present invention applies the access points (APs) and client devices as the CMTS and cable modems in the conventional cable broadband network systems, respectively. In other words, the present invention proposes an innovative high-speed distributed cable broadband system (Hi-SD CBS) that may provide a cable broadband service for conventional cable TV network system. The access point (AP) is an entrance device to provide a short-range wireless transmission device (computer or personal digital assistance phone) connecting a network.

The radio signals propagate through the entire cable networks to make links between the access point and client devices. Although there is some amount of radio signal loss propagating along co-axial cables the propagating loss is far less than those radiating from devices' antennas in wireless environments. The network reachable range in cable network system shall be larger than in wireless environments. The communication protocol between the client device and the AP comprises 802.3 and 802.11 including but not limited to, 802.11a, 802.11b, 802.11g, 802.11i or 802.11x.

Referring to FIG. 2, it illustrates a wireless local access network system. Client devices 122 in the coverage range are communicated wirelessly with a short-range wireless transmission module 121 of an access point 120 through short-range wireless transmission module 123. The access point 120 may connect an internet 124, such as Ethernet, to act like an entry point to access Internet for client users. In other words, the client devices 122 may transmit or receive data through the internet 124. The radio outputs of access point and client devices are replaced with impedance matched cable connectors. The proposed Hi-SD CBS applies the modified 802.11 WLAN access point and client devices as the CMTS and cable modems in the conventional cable broadband network systems, respectively. Referring to FIG. 3, it illustrates two clusters of WLANs with wireless bridges aggregating into an AP to Internet. In the first cluster, client devices 132 in the coverage range are communicated wirelessly with a short-range wireless transmission module 131 of a network bridging device 130 through short-range wireless transmission module 133. As the same, in the second cluster, client devices 139 in the coverage range are communicated wirelessly with a short-range wireless transmission module 138 of a network bridging device 137 through short-range wireless transmission module 140. Moreover, the network bridging device 130, 137 may be communicated wirelessly with a short-range wireless transmission module 135 of a network bridging device 134 through short-range wireless transmission module 131, 138, respectively. In one embodiment, the network bridging device 130, 134 and 137 comprise an access point (AP), bridge or router. The access point 134 may connect an internet 136, such as Ethernet, to act like an entry point to access the Internet 136 for client devices 132, 139. In other words, the client devices 132, 139 may transmit or receive data through the internet 136.

Referring to FIG. 4, it is an AP and several client devices connected to nodes of a cable TV network system. Client devices 141 are connected with an AP 143 through node 144 of a cable TV network 142. The node 144 is an example. The access point 143 may connect an internet 145, such as Ethernet, to act like an entry point to access the Internet 145 for client devices 141. In other words, the client devices 141 may transmit or receive data via the access point 143 through the internet 145. Furthermore, the client devices 141 may receive the transmitted data from the internet 145 through the cable TV network 142. The radio signals from the AP 143 and the client devices 141 are propagating in the cable network system. Here, the cables act like the extended antennas with ultra-high gains along the cable propagation directions.

Referring to FIG. 5, it shows the propagation loss for length of 100 meters for different co-axial cables versus radio frequencies. The propagation loss increases with higher frequency for a fixed cable length of 100 meters. Due to much less radio signal loss propagating along co-axial cable networks systems than the path-loss in wireless environments, the transmitting distance along a co-axial cable from a transmitter to a designated receiver in a cable network is much longer than the distance from a transmitter radiating radio signal to a designated receiver. The co-axial cable for the radio signal can be considered as extended ultra-high gain antennas to inter-connect the termination device and customer premise devices in cable network systems. The antenna gains are very high along with the cable propagation directions. A typical signal loss propagating in 100 meters versus different cables and radio frequencies is shown in FIG. 5. The frequency bands 2.4 GHz~2.48 GHz and 4.9 GHz~5.9 GHz used for 802.11b/g and 802.11a shall be able to propagate significant distances along the cable network. With auto gain control (AGC) and high receiver sensitivity, the signal dynamic range for 802.11 WLAN receivers can be as large as 70 dB. This indicates that 802.11 transceivers shall be able to adapt wide range of radio signal strengths for complicated cable network systems. The WLAN systems are more tolerated to various cable network environments.

Figure 6:
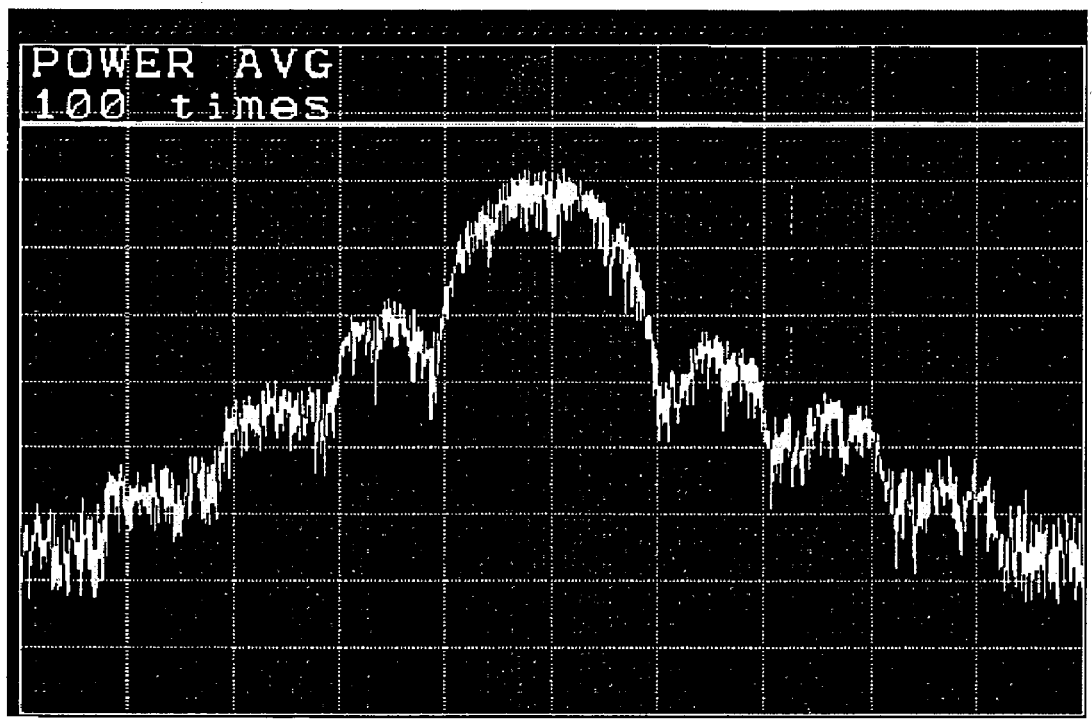
FIG. 6 shows a 2.4 GHz radio signal propagating before and after 100 meters of RG-58 co-axial cable.
Figure 6:
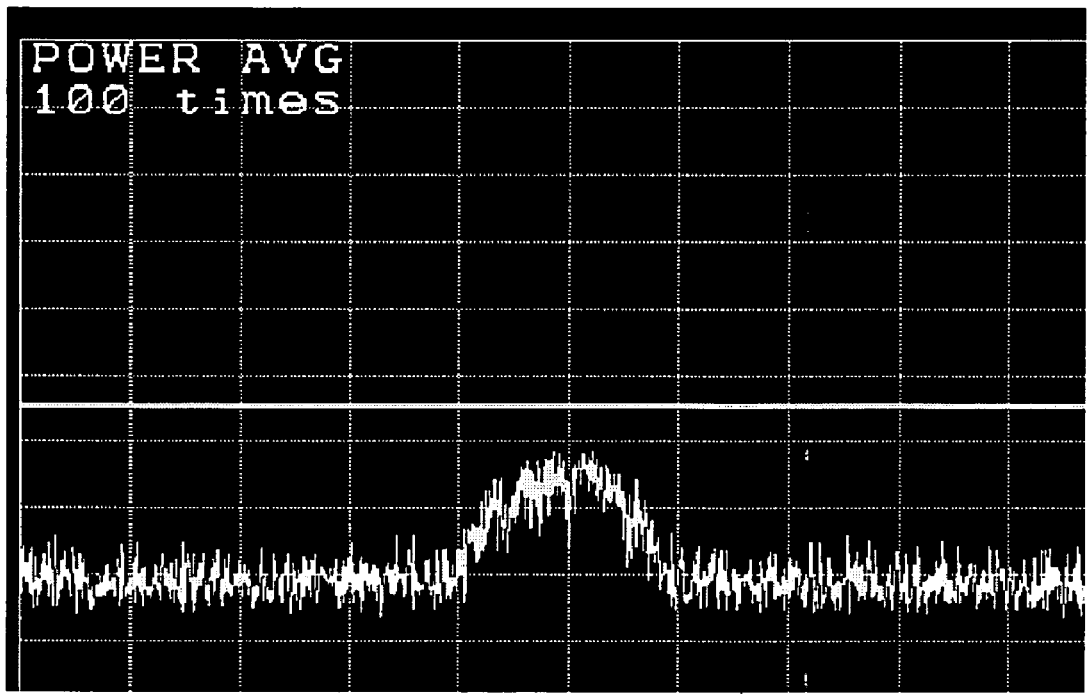

Referring to FIG. 6, it shows a 2.4 GHz radio signal propagating before and after 100 meters of RG-58 co-axial cable. Since radio environments are more stable in cable network systems than in complicated wireless environments, the issues associated with interference and multi-paths are less severe and easier to control in cable network systems. Thus the planning for network system is easier to achieve in cable systems.

Figure 8:
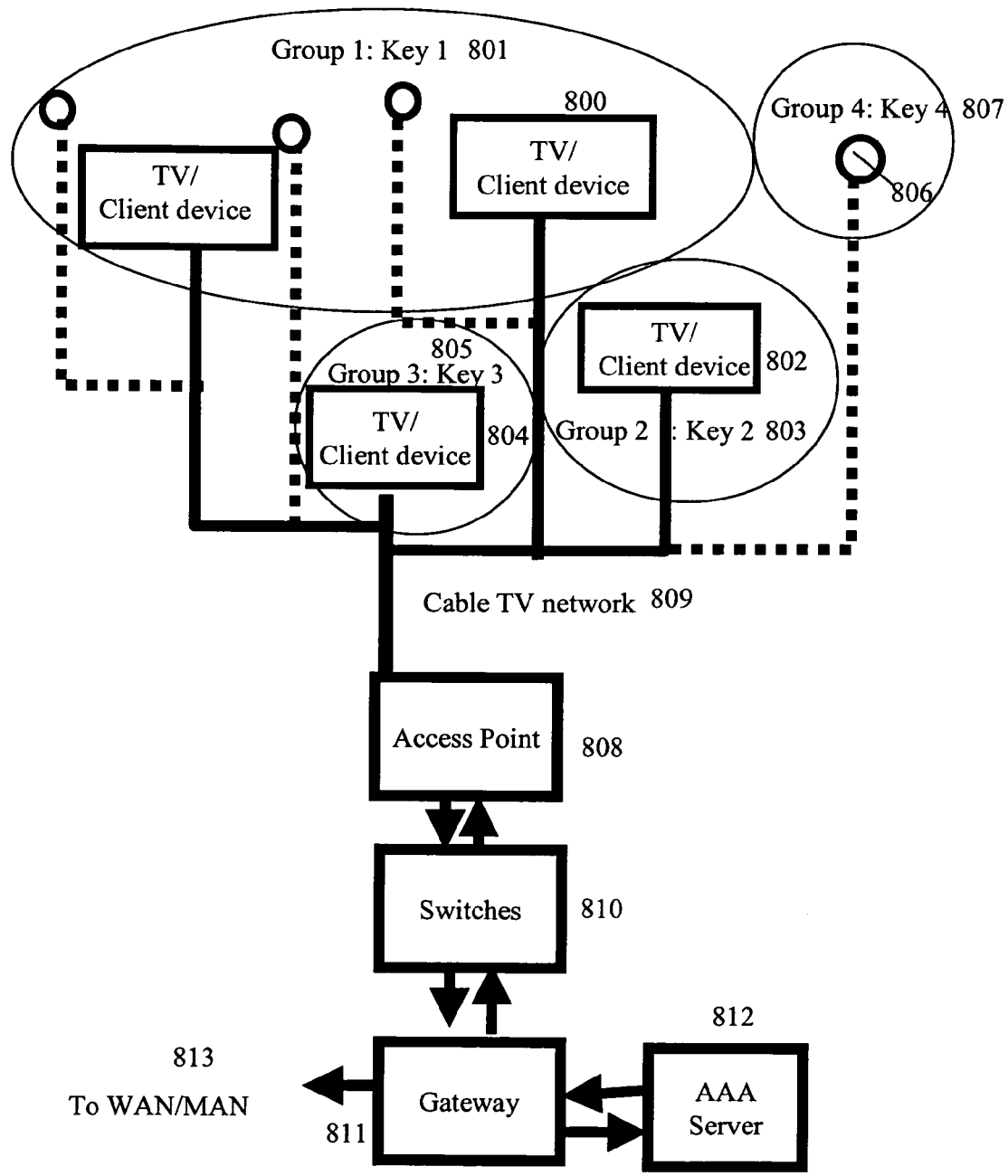
FIG. 8 illustrates the security and network management system implemented in Hi-SD CBS.

Referring to FIG. 8, it illustrates the security and network management system implemented in Hi-SD CBS. The security between access point and client devices is accomplished by providing an encryption key to a group of logistic client users (or a single user). Network management software can be installed to control each individual client user to guarantee the quality of service according to access privilege, priority, and data flow. Client devices 800, 802, 804 and 806 of different user groups can be secured and isolated by sending out different encryption keys 801, 803, 805 and 807, respectively from AP 808. The client devices 800, 802, 804 and 806 are communicated with the AP 808 through a cable TV network 809. The AP 808 can pass the user information and receive instructions from a gateway 811 and security server 812. Moreover, a switch 810 may connect with the AP 808 and the gateway 811 to control the data flow among the AP 808, the gateway 811 and security server 812. The AP 808 can pass the information and receive instructions from the gateway 811 or an AAA server (Authentication, Authorization, Accounting) 812, as shown in FIG. 8. The gateway 811 is connected with a local network 813. In one embodiment, the local network 813 comprises WAN, MAN or LAN.

The client devices 800, 802, 804 and 806 are communicated with the AP 808 through a communication protocol. For security, the 802.1x and 802.11i protocols implemented in WLAN can be applied to this Hi-SD CBS without significant modification.

Figure 9:
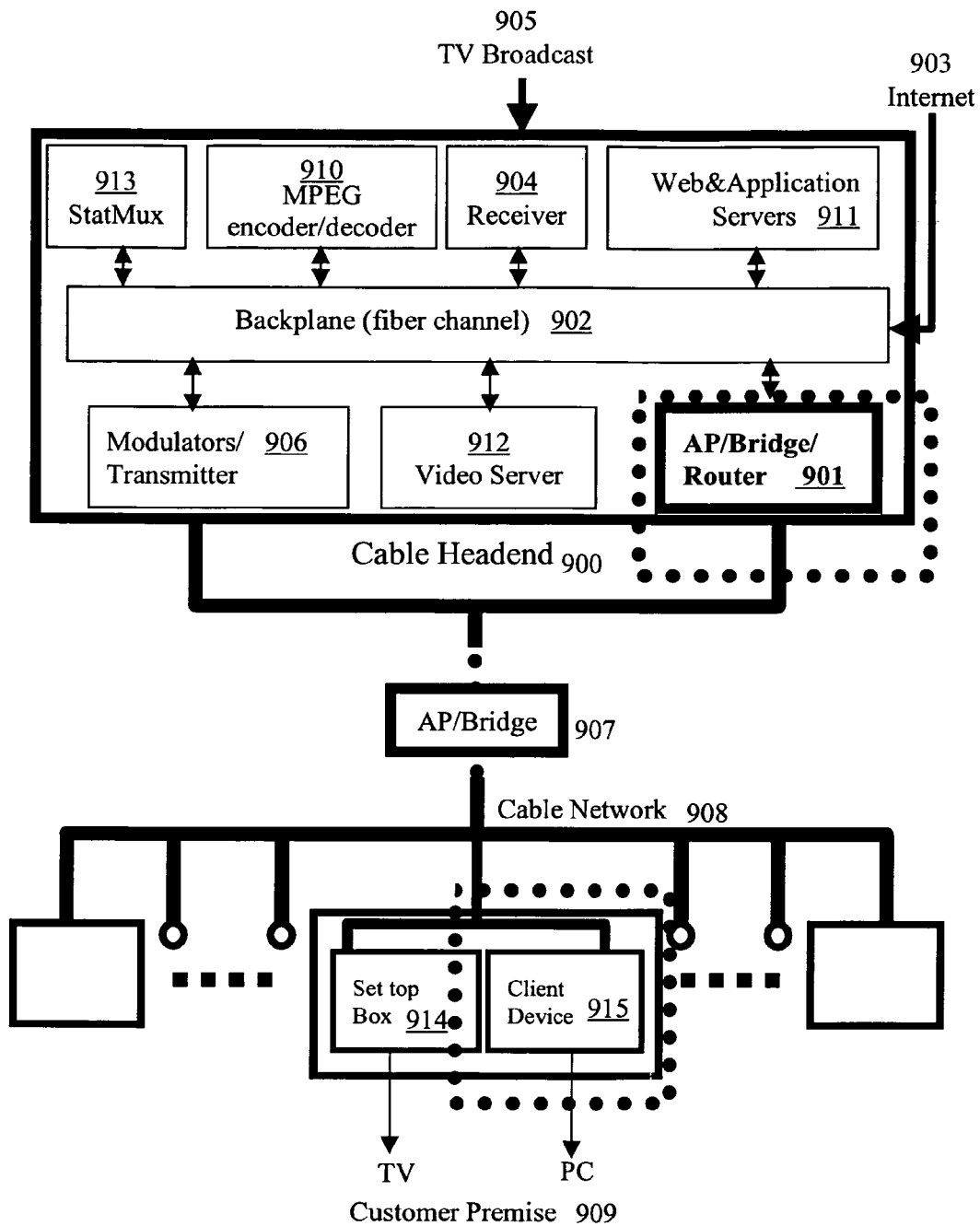
FIG. 9 illustrates a large cable operator system with cable headend and customer premise.

Referring to FIG. 9, it illustrates a large cable operator system with cable headend and customer premise. In one embodiment, a network bridging device 901 comprises an AP, bridge or router. The cable headend 900 comprises a backplane 902 electrically connected an internet 903. In general, the backplane 902 is made of a PCB to provide a connection by controlling cards, such as display card, audio card or network card, of an electrical system. Moreover, the backplane 902 may be designed with a fiber channel to communicate with the internet 903 with fiber transmission. A receiver 904 is electrically connected with the backplane 902 to receive a TV broadcasting 905 signals. A transmitter module 906 is electrically connected with the backplane 902 and a network bridging device 907 to transmit the TV broadcasting 905 signals. The network bridging device 907 is connected to a customer premise 909 through the cable network systems, while the other ports of the network bridging device 907 are connected to either optical fiber backbone or a satellite link. In one embodiment, the network bridging device 907 comprises an AP, bridge or router. The APs/Bridges 907 in between the cable headend 900 and the customer premise 909 illustrate the relay for large cable network. Besides, MPEG module 910 is electrically connected with the backplane 902. In general, the MPEG module 910 comprises a MPEG encoder and a MPEG decoder. A web server 911 is electrically connected with the backplane 902 to communicate with the internet 903. A video server 912 is electrically connected the backplane 902 to process the received TV broadcasting 905 signals. A statmux port concentrator 913 is electrically connected the backplane 902 to optimize the data flow.

The customer premise 909 may comprise a set top box 914 and a client device 915. The client device 915 comprises a PC connected the set top box 914. The customer premise 909 and the AP 901, 907 are communicated with each other through a communication protocol.

Figure 10:
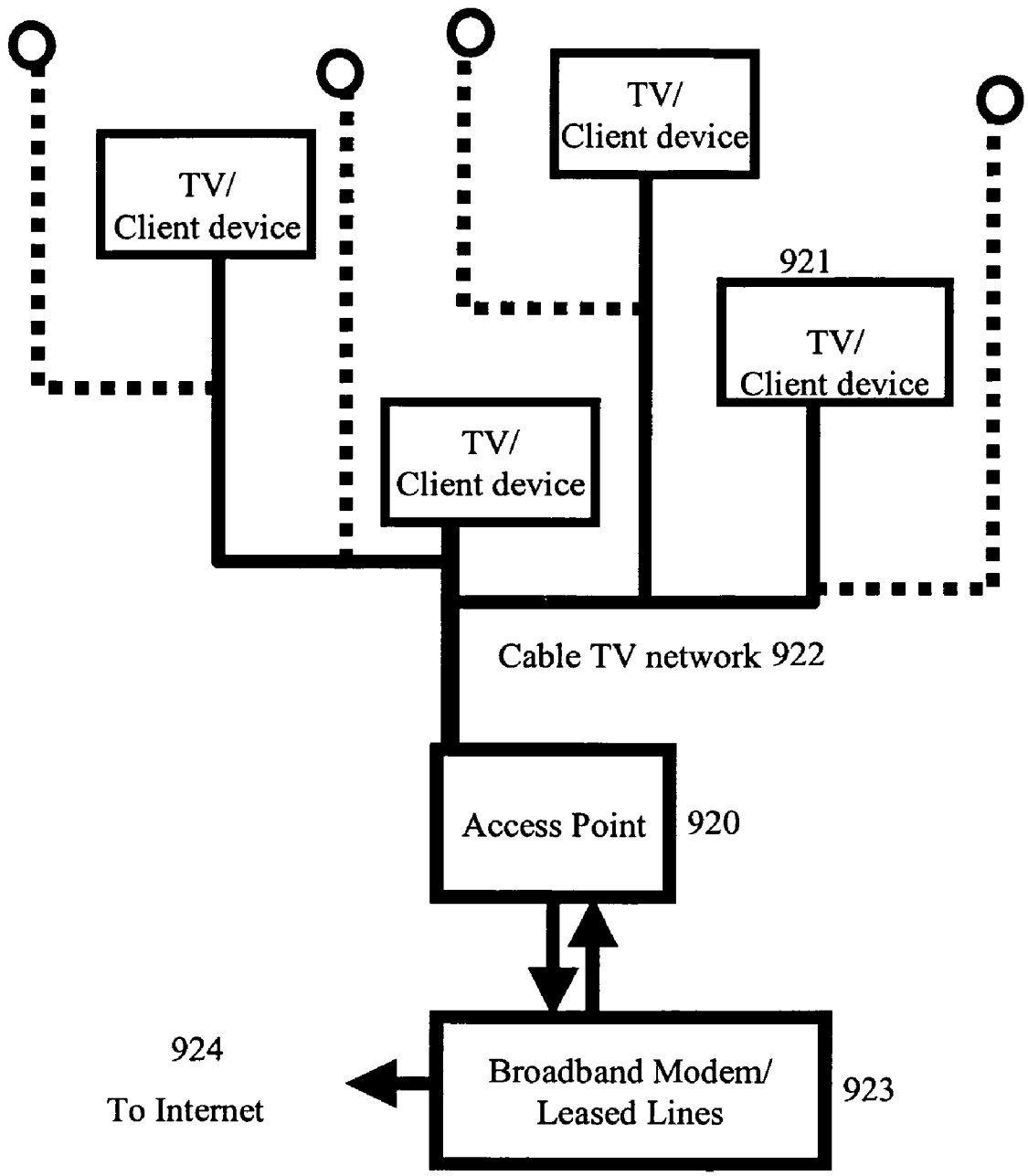
FIG. 10 illustrates a small or a medium size of Hi-SD CBS applied to a cable TV network systems.

Referring to FIG. 10, it illustrates a small or a medium size of Hi-SD CBS applied to a cable TV network systems. The small or medium size of Hi-SD CBS may be applied to those used in motels or hotels. The WAN ports of the AP/router device 920 are connected to a leased line or a broadband modem 923, while the radio signal port is connected to the cable end in the existing cable TV network systems 922 distributed to different rooms and locations. The AP 920 connected to either a broadband modem or a leased line 923, provides the Internet 924 entry point for client devices 921 through the cable TV network systems 922. The broadband modem or leased line 923 is connected with the Internet 924. The radio signal ports of the client devices 921 are connected to the output nodes of the distributed cable TV network 922. To access the broadband network, a computer device can be connected or coupled to the client device 921 either by an Ethernet LAN port or a UBS port. The AP 920 is communicated with the client devices 921 through a communication protocol.

Figure 11:
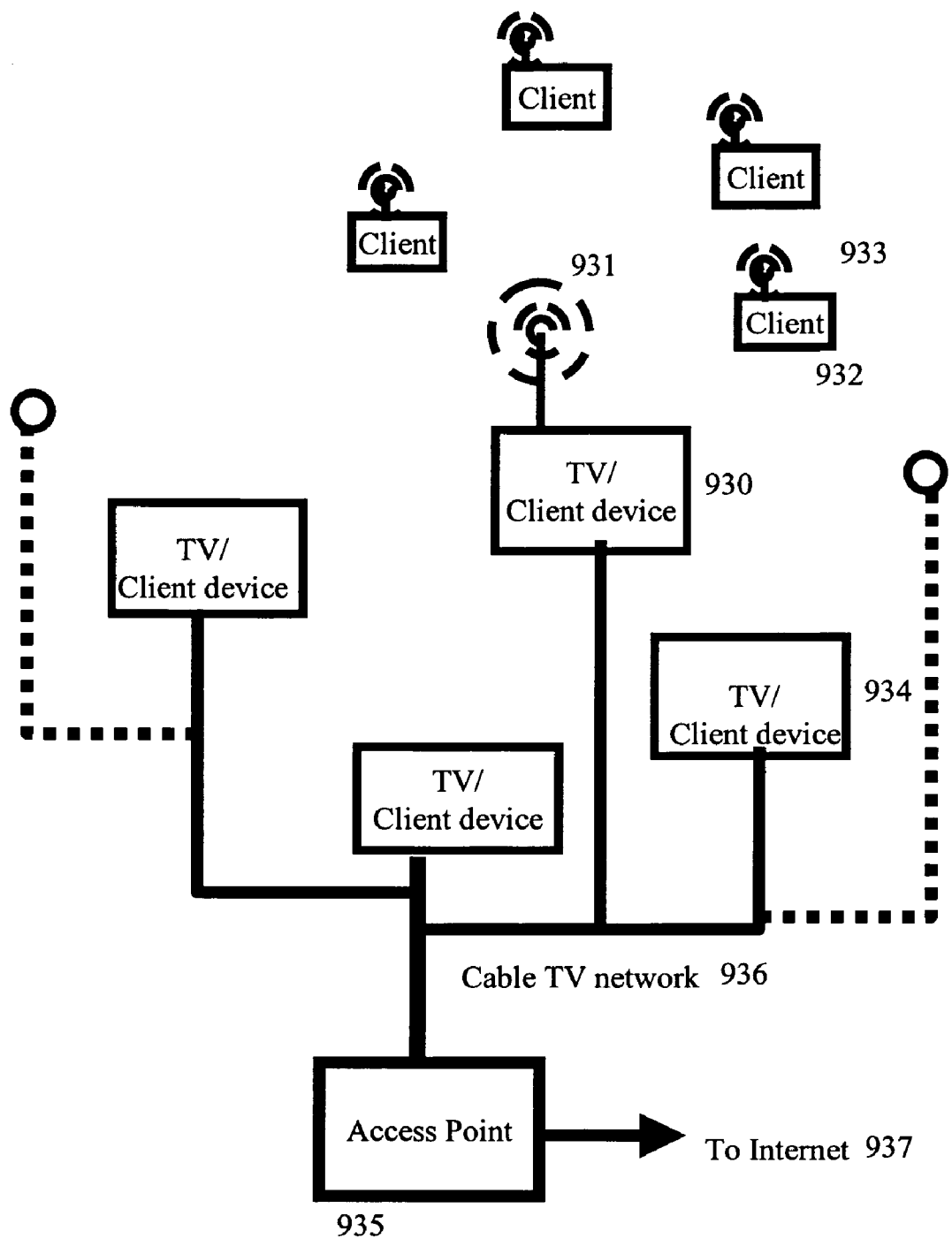
FIG. 11 illustrates the client devices in Hi-SD CBS can be used as an AP client device to provide wireless connection in the customer premise site.

Referring to FIG. 11, it illustrates the client devices in Hi-SD CBS can be used as an AP client device to provide wireless connection in the customer premise site. In this embodiment, the client devices 930 having short-range wireless transmission module may provide an entry point to access another wireless client devices 932, as shown FIG. 11. In other words, the short-range wireless transmission module 931 of the client devices 930 transmit the radio signals to facilitate receiving by the short-range wireless transmission module 933 of another client devices 932, and the short-range wireless transmission module 931 may receive a radio signals emitted by the short-range wireless transmission module 933. Moreover, client devices 934 are without short-range wireless transmission module. In another aspect of the Hi-SD CBS, the client device can support a cable client device and wireless access point at the same time. In one end, the client devices 930 make the Internet 937 link through the cable TV network 936, while on the other end, it can provide the wireless access point in the client sites 932. It is also appreciated that, in different aspects of this Hi-SD CBS, the different radio frequency bands and various communication protocols are applied in the system, and the varieties of different uplink and downlink network systems are connected to Hi-SD CBS. An AP 935 is connected with the client devices 934 and the client devices 930 through a cable TV network 936. The AP 935 is connected with the internet 937 through the cable TV network 936. The client devices 930, 934 and the AP 935 are communicated with each other through a communication protocol.

Figure 7:
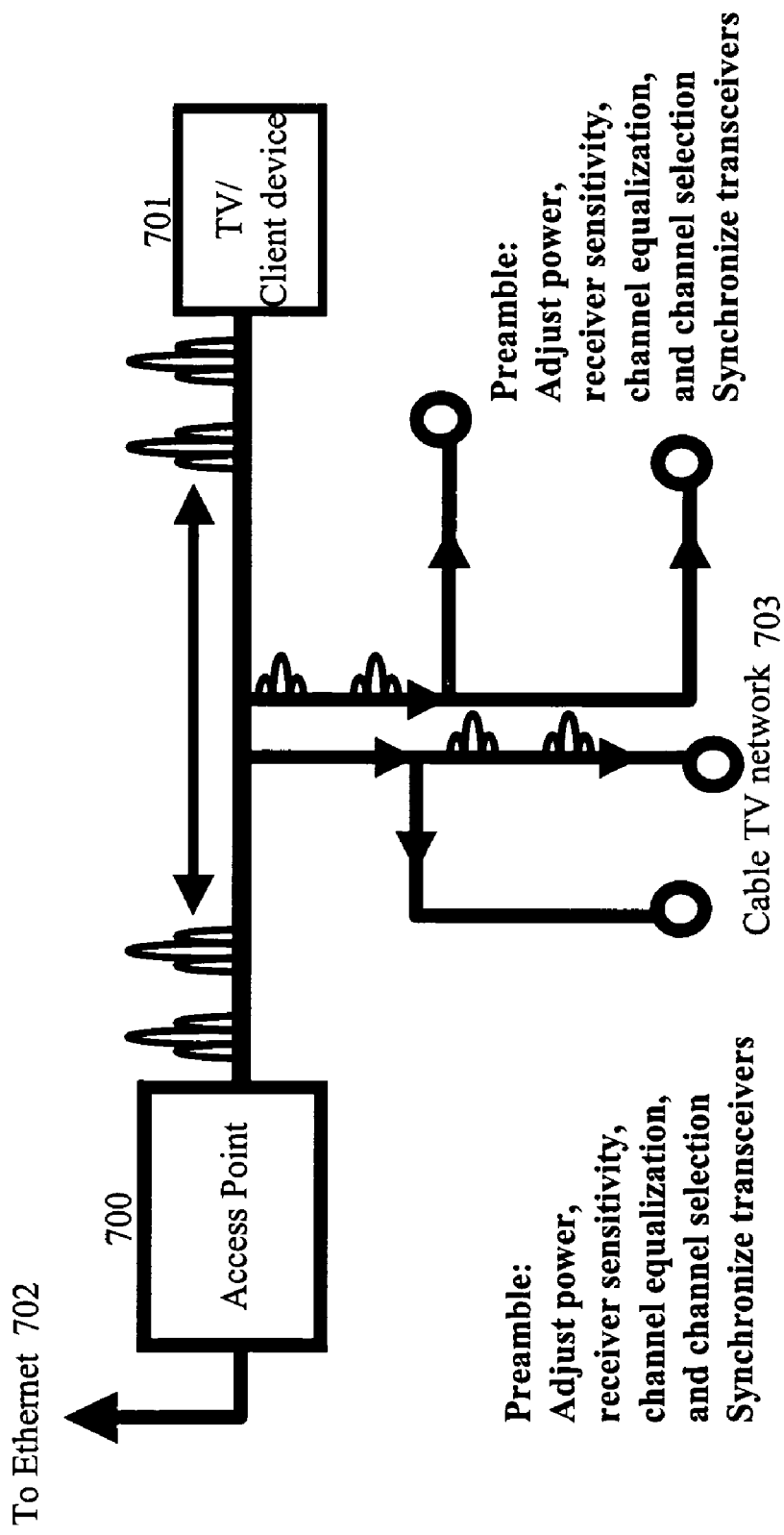
FIG. 7 illustrates a client device and an AP sending preamble sequences.

Referring to FIG. 7, it illustrates a client device and an AP sending preamble sequences. In different aspects of this Hi-SD CBS, an AP 700 is connected with client devices 701 through a cable TV network 703. With the cable connection between access point 700 and client devices 701 in distributed cable TV network systems, the links between access point 700 and each individual client devices 701 can be established by several preamble sequences to adjust transmission power and receiving sensitivity, channel selection, and channel equalization and to synchronize transceivers between the client device 701 and AP 700, as illustrate in FIG. 7. To improve the pre-amble efficiency and ready for transmission with the client device 701, the access point 700 may poll the cable network conditions from all the client devices 701 and store the link condition information in memory for data transmission. After establishing the links between access point 700 and client devices 701, the data packets is ready to transmit and receive for client devices 701 throughout the cable network system 703. As the same, the access point 700 is connected with an internet 702.

Since the cable TV network systems are designed for its original frequency bands for TV channels, the conventional boosters and some highly isolated splitters in the cable TV network systems prevent other frequency bands passing through. Splitters before those components (boosters and highly isolated splitters) are introduced to separate the radio frequencies bands in different paths. The splitter is designed to allow the TV band to pass the original components, while the other frequency bands pass through other path without letting the TV channel frequency bands through. A combiner is used to re-joint the two frequency bands back to the co-axial cable network systems.

As in 802.11 WLAN systems, AP and client devices are sending out beacons through the entire cable network. A preamble sequence is applied between AP and a client device to adjust the transmitting radio power and the receiver sensitivity, and to synchronize the two transceivers. In the signal header, it determines the different PHYs used for this transmission, that is, different CCK for 802.11b or OFDM for 802.11g and 802.11a. Depending the link quality between AP and client, different transmission rates, 11 Mbps, 22 Mbps, 33 Mbps, 54 Mbps, and 108 Mbps, can be applied for the data transmission in the link. To avoid the interference between different links in the shared cable network systems, channel management can be applied to minimize the contention and more effectively to manage the communication traffic. For examples, some channels can be reserved for particular links according to priority, data flow, and their applications.

In summary, the present invention proposed an innovative Hi-SD CBS for cable broadband service in existing cable TV network systems. The Hi-SD CBS is based on the system infrastructure of Wireless Local Access Network (WLAN). Due to the fast growth and technology advance in WLAN systems, Hi-SD CBS can become a very attractive and competitive alternative for high-speed cable broadband service in cable TV network systems besides the conventional cable modem systems.

Although specific embodiments have been illustrated and described, it will be obvious to those skilled in the art that various modifications may be made without departing from what is intended to be limited solely by the appended claims.

What is claimed is:

1. A high-speed distributed cable broadband system, comprising:
 a termination unit having a first network bridging device;
 a second network bridging device connected with said first network bridging device through a cable network;
 a customer premise unit connected to said second network bridging device through said cable network;
 wherein said customer premise unit, said first network bridging device and said second network bridging device communicate with each other through a communication protocol;
 wherein said termination unit further includes:
 a backplane electrically connected with an internet;

a receiver electrically connected with said backplane to receive a TV broadcasting signal;

a transmitter module electrically connected with said backplane and said second network bridging device to transmit said TV broadcasting signal, wherein said transmitter module includes a transmitter and a modulator;

a MPEG module electrically connected with said backplane;

a video server electrically connected with said backplane to process said TV broadcasting signal;

a web server electrically connected with said backplane to communicate with said internet; and a statmux port concentrator electrically connected said backplane; and preamble sequences linked between said termination unit and said customer premise unit to adjust a transmitting radio power, a receiver sensitivity, channel equalization, and to synchronize said transmitter and said receiver for data transmission between said termination unit and said customer premise unit.

2. The system in claim 1, wherein said MPEG module comprises a MPEG encoder and a MPEG decoder.

3. The system in claim 1, wherein said first network bridging device comprises an AP, a bridge or a router.

4. The system in claim 1, wherein said second network bridging device comprises an AP, a bridge or a router.

5. The system in claim 1, wherein said customer premise unit comprises a set top box and client device.

6. The system in claim 5, wherein said client device comprises a PC connected to said set top box.

7. The system in claim 1, wherein said communication protocol comprises 802.3, 802.11, 802.11a, 802.11b, 802.11g, 802.11i or 802.11x.

* * * * *